(12) United States Patent
Sierla

(10) Patent No.: US 10,212,787 B2
(45) Date of Patent: Feb. 19, 2019

(54) METHOD AND SYSTEM FOR CONTROLLING A LIGHTING NETWORK

(71) Applicant: Aalto University Foundation, Aalto (FI)

(72) Inventor: Seppo Sierla, Helsinki (FI)

(73) Assignee: Aalto University Foundation, Aalto (FI)

( * ) Notice: Subject to any disclaimer, the term of this patent is extended or adjusted under 35 U.S.C. 154(b) by 1 day.

(21) Appl. No.: 15/520,947

(22) PCT Filed: Oct. 21, 2015

(86) PCT No.: PCT/FI2015/050716
§ 371 (c)(1),
(2) Date: Apr. 21, 2017

(87) PCT Pub. No.: WO2016/062923
PCT Pub. Date: Apr. 28, 2016

(65) Prior Publication Data
US 2017/0347433 A1    Nov. 30, 2017

(30) Foreign Application Priority Data
Oct. 21, 2014   (FI) ...................................... 20145923

(51) Int. Cl.
*H05B 37/02* (2006.01)
*G06K 9/00* (2006.01)
(Continued)

(52) U.S. Cl.
CPC ..... *H05B 37/0245* (2013.01); *G06K 9/00785* (2013.01); *H05B 33/0845* (2013.01);
(Continued)

(58) Field of Classification Search
CPC ............ H05B 33/0845; H05B 37/0227; H05B 37/0245; H05B 37/0272; H05B 37/034
(Continued)

(56) References Cited

U.S. PATENT DOCUMENTS 8,729,446 B2 *   5/2014   Verfuerth ........... H05B 37/0272
                                                        250/205
9,854,645 B2 * 12/2017   Anderson .......... H05B 37/0227
(Continued)

FOREIGN PATENT DOCUMENTS

CN      101267703 A       9/2008
WO      2010010493 A2     1/2010
(Continued)

OTHER PUBLICATIONS

Finnish Patent and Trademark Office, Search Report issued for FI20145923, dated May 27, 2015.
(Continued)

*Primary Examiner* — Tung X Le
(74) *Attorney, Agent, or Firm* — Berggren LLP

(57) ABSTRACT

A controlling of a lighting network based on traffic monitoring comprises steps of determining plurality of coverage areas of set of luminaires, where each luminaire comprises at least one light source. Information related to a presence of users in said coverage areas is received. This may relate both outdoor or indoor areas and activity. A status of at least certain luminaire is then changed to a reserve status, when a last detected user exits the coverage area. Each coverage area or luminaire is providing with an expected value for the time of when the next user is expected to arrive in the coverage area of said luminaire, A set of luminaires [R] of said luminaires with the reserve status to be controlled, such as dimmed, is then defined and information related to demand response requests $[D_1, \ldots, D_n]$ of an electric power
(Continued)

grid is received. In addition controlling, such as dimming, at least one of said defined set of luminaires in said reserve is performed in order to fulfill said demand response requests at least partially.

24 Claims, 3 Drawing Sheets

(51) Int. Cl.
    *H05B 33/08* (2006.01)
    *H05B 37/03* (2006.01)
(52) U.S. Cl.
    CPC ..... *H05B 37/0227* (2013.01); *H05B 37/0272* (2013.01); *H05B 37/034* (2013.01); *Y02B 20/72* (2013.01)
(58) Field of Classification Search
    USPC .................................................. 315/152, 312
    See application file for complete search history.

(56) References Cited

U.S. PATENT DOCUMENTS

| | | | |
|---|---|---|---|
| 2010/0262297 A1 | 10/2010 | Shloush et al. | |
| 2011/0001626 A1* | 1/2011 | Yip ................... | H05B 37/0263 340/635 |
| 2015/0123546 A1* | 5/2015 | Pandharipande .. | H05B 37/0245 315/153 |
| 2015/0257240 A1* | 9/2015 | Matovina ........... | H05B 37/0263 315/312 |
| 2016/0150622 A1* | 5/2016 | Flinsenberg ....... | H05B 37/0227 315/297 |
| 2016/0198548 A1* | 7/2016 | Monaci .............. | H05B 37/0218 315/152 |

FOREIGN PATENT DOCUMENTS

| | | |
|---|---|---|
| WO | 2011055259 A1 | 5/2011 |
| WO | 2012172470 A1 | 12/2012 |
| WO | 2013144756 A2 | 10/2013 |
| WO | 2014147494 A1 | 9/2014 |
| WO | 2014147510 A1 | 9/2014 |

OTHER PUBLICATIONS

Zotos, N. et al., "Case study of a dimmable outdoor lighting system with intelligent management and remote control". Telecommunication and Multimedia (TEMU), International Conference on Jul. 30, 2012. 2012 IEEE, Conference Proceedings Article, pp. 43-48. XP032233180; ISBN 978-1-4673-2780-0; ISBN 1-4673-2780-8.

* cited by examiner

METHOD AND SYSTEM FOR CONTROLLING A LIGHTING NETWORK

PRIORITY

This application is a U.S national application of PCT-application PCT/FI2015/050716 filed on Oct. 21, 2015 and claiming priority of Finnish national application FI20145923 filed on Oct. 21, 2014, the contents of all of which are incorporated herein by reference.

TECHNICAL FIELD OF THE INVENTION

The invention relates to a method and system for controlling a lighting network based on a traffic monitoring, wherein the lighting network comprises set of luminaires, and each luminaire comprises at least one light source.

BACKGROUND OF THE INVENTION

Numerous of systems for controlling a lighting network based on a traffic monitoring are known, where the individual light sources or group consisting of plurality of light sources are switched off or switched on. The switching is often done by using some light sensors or timer, when controlling lighting network due to environmental parameters (light condition), or motion sensor or other suitable devices when the controlling is based on an active traffic loads on a road or other area. Reasons for controlling the lighting network includes among other to save energy, but also increasing lifetime of the equipment. Also use of demand responses of a smart grid is known in the outdoor lighting systems. Typically outdoor lighting demand response have two approaches, namely 1) use an alternative energy source or local energy storage when a demand response signal is received, or 2) shed load when a demand response signal is received.

The prior art document WO2013144756 relates for operation of a plurality of lighting units of a lighting network according to energy demand or energy supply. According to WO2013144756 a demand response of a smart grid may be proactively managed based on time intervals or the zone of the lighting units of the lighting network. An adjusting energy demand of the outdoor lighting network connected to a smart power grid is provided and includes the following steps: collecting first zone energy supply information and first zone load demand information of each of a plurality of first zone lighting units of the lighting network for each of a plurality of first zone subintervals; collecting second zone energy supply information and second zone load demand information of each of a plurality of second zone lighting units of the lighting network for each of a plurality of second zone subintervals; receiving electricity prices from a utility for a plurality of future first zone subintervals of the first zone subintervals and for a plurality of future second zone subintervals of the second zone subintervals; proactively adjusting a first zone light operation strategy of the first zone lighting units prior to the future first zone subintervals based on the first zone energy supply information, the first zone load demand information, and the electricity prices; and proactively adjusting a second zone light operation strategy of the second zone lighting units prior to the future second zone subintervals based on the second zone energy supply information, the second zone load demand information, and the electricity prices.

Another prior art document WO2011055259 is directed for a control system for an object-sensing lighting network, and for a control system for an outdoor lighting fixture that dynamically determines a relationship to a plurality of other lighting fixtures. The control system of a lighting fixture may dynamically determine its relationship to a plurality of other lighting fixtures along one or more normal paths of activity by monitoring travel times of an object between the lighting fixture and a plurality of other lighting fixtures during periods of low activity. WO2011055259 is not related to demand response, but each street lighting fixture node has a motion detector system in electrical communication with the controller of the light fixture node.

Further WO 2014/147510 A1 describes a light management information system for an outdoor lighting network (OLN) system, having a plurality of outdoor light units each including at least one sensor type, where each of the light units communicates with at least one other light unit, at least one user input/output device in communication with at one or more of said outdoor light units, a central management system in communication with light units, said central management system sends control commands and/or information to one or more of said outdoor light units, in response to received outdoor light unit status/sensor information from one or more of said outdoor light units or received user information requests from said user input/output device, a resource server in communication with said central management system, wherein the central management system uses the light unit status/sensor information and resources from the resource server to provide information to the user input/output device and/or reconfigure one or more of the lights units.

US 2010/262297 describes a solution, where lighting devices are configured to communicate with one another and with external systems. Sensors located at such lighting devices communicate with the external systems and with others of the lighting devices. Lighting is controlled to maintain safety, to drive customer traffic within a retail facility, or to conserve energy. An application programming interface provides a common mechanism for control of various lighting device types.

WO 2012/172470 describes a lighting system including at least one controller and a memory containing program portions which configure the controller to obtain weather forecast information including one or more of current and expected weather conditions over a period of time, and thereby determine one or more lighting settings based upon the weather forecast information.

In addition WO 2010/010493 A1 discloses a solution of setting up a luminaire, said luminaire being part of a network of luminaires and each luminaire of said network of luminaires being a node of a wireless communication network.

There are however some disadvantages relating to the known prior art, such as the controlling is very often limited to quite narrow area, the switching of the certain portion of the lighting network induced consumption peaks into the electric power grid, as well as continuous switching on and off or even dimming and brightening easily disturbs urban environments. In addition also lighting operating strategy is often changed at intervals of e.g. one day and at subintervals of one hour, whereupon the system does not react to real-time detection of road users. Thus, any dimming done by the prior art solutions degrades traffic safety. Moreover in the systems using motion detection the cost of installing and maintaining the dedicated motion detection electronics is very significant, and having such dedicated equipment implies that each system in a smart city that needs traffic monitoring data will have to have its own sensors.

SUMMARY OF THE INVENTION

An object of the invention is to alleviate and eliminate the problems relating to the known prior art. Especially the object of the invention is to provide a system for controlling, especially balancing consumption peaks in an electric power grid by controlling the usage or electric consumption of the lighting network without sacrificing the safety of the users, such as road users. In addition the object of the invention is to control the a lighting network based on a traffic monitoring so that any annoying flashing effect of the light sources in the network can be avoided.

The object of the invention can be achieved by the features of independent claims.

The invention relates to a method for controlling a lighting network according to claim 1. In addition the invention relates to a system for controlling a lighting network according to claim 16, as well as a computer program product according to claim 23.

According to an embodiment of the invention a plurality of coverage areas of set of luminaires is determined for controlling the lighting network. The controlling the lighting network is advantageously performed based on a traffic monitoring. The lighting network may be an outdoor lighting network, such as public lighting on the roads where the traffic monitoring comprises e.g. determining road users, as an example, but the invention can also be applied for other lighting networks, such as indoor lighting network for example in buildings, offices or the like, where the traffic monitoring comprises determining users inside the building or the like. The lighting network comprises advantageously set of luminaires, where each luminaire comprises at least one light source. The light source may be e.g. an individual LED, or a group of LEDs, street light pillar with one or more light emitting means, such as LEDs or bulbs.

In addition for controlling the lighting network also information related to a presence of users in said coverage areas is received, whereupon a status of at least certain luminaire is changed to a reserve status, when a last detected user exits the coverage area of said luminaire. The information related to a presence of users in certain areas can be obtained for example presence sensors determining motions or presence of users, such as from detecting sensors of traffic monitoring systems, position signals received from vehicles, such as vehicle positioning systems or position signals from smart phone applications. The presence information of users (either outdoor or indoor) in coverage areas may also comprise information of a type of said user, such as pedestrian, cyclist or vehicle, whereupon the maximum dimming level and/or the size of the coverage area may be determined based on the type of the user at least partly. For example pedestrians and bikes require a shorter length of lit road or other area than a car, whereupon the type of the user may also be taken into account when determining the size of the coverage area, and thereby saving significantly energy.

According to an embodiment of the invention an expected value for each coverage area or luminaire is provided for the time of when the next user is expected to arrive in the coverage area of said luminaire. The expected value may be presented for example in seconds representing how long it probably takes before the next user arrives to the area of interest. The expected value may be obtained in numerous different ways, such as obtaining it from historical statistical data for that time of day, week and/or year at that location, by prediction algorithms using e.g. real-time measurements from traffic monitoring systems, where the system may use machine learning as known by a skilled person or obtaining it based on knowledge of the users planned route, such as from navigators in vehicles or other ends used for route planning.

Additionally also a set of luminaires [R] with the reserve status is defined so that these set of luminaires with the reserve status may be used for fulfilling demand response requests, such as to be controlled, for example dimmed. The controlling of the sets may be done either simultaneously or independently of each other.

Furthermore information related to the demand response requests $[D_1, \ldots, D_n]$ of an electric power grid is received for indicating load shedding requirement. The sequence of $D=(D_1, \ldots, D_i)$ may be defined as a sequence of demand response requests from the electric power grid. In addition a function $Power(D_i)$ may be defined for providing the load shedding requirement in [W] for said demand response request Di, as well as a sequence of $L=(l_1, \ldots l_n)$ as a set of luminaires that may be controlled, where each $l_i$ in L comprises a single luminaire or a group of luminaires that are to be dimmed simultaneously. Moreover a function $Saving(l_i)$ may be defined for providing the load shedding in [W] when the luminaire $l_i$ is dimmed.

The load shedding may include the load (e.g. the load in [W] (Watts)) to be released, or negotiation request or demands for controllers, who can offer or otherwise fulfill the requirements for example in a certain tariff or in a certain time period, as an example. The offering may e.g. comprise time limits, power limits or price, for example, where the most suitable offer can be selected. In addition it is to be noted that the electric power grid is advantageously as a smart grid, and advantageously comprises also other power usages or load with demand response capability than only lighting network, such as domestic electric appliance, as well as advantageously also other ends. In addition in some embodiments the demand response request may be received from a virtual power plant (VPP) or aggregator, which is the entity that manages the said load with demand response capability.

The method according to the invention naturally comprises also controlling step, such as dimming at least one of said defined set of luminaires in said reserve in order to fulfil said demand response requests at least partially. When the certain defined set of luminaires from the reserve is participated to the demand response, it is advantageously removed from the sets of reserve luminaires.

The set of luminaires comprises advantageously at least one light source, such as individual LED luminaires, but also other light source suitable to be adjusted frequently, such as dozens of times in an hour, as well as rapidly, such as in only few seconds, for example. Also other requirements may be claimed. According to an example also a certain maximum level for dimming may be defined for a set of luminaires in the reserve beforehand, such as 40% from maximum brightness, for example. The level of dimming depends on for example public acceptance, but possibly also from other factors, such as the type of the area related to the set of luminaires and safety requirements depending e.g. on the type of users (pedestrian or cars, for example). In addition the maximum dimming level or the size of the coverage area may also depend on the time of day, week and/or year; and/or location of said coverage areas of the set of luminaires in reserve.

The set of luminaires in the reserve [R] is a subset of set of luminaires $[L=(l1, \ldots ln)]$ in the entire system, whereupon a function Select(R) may be defined for providing the element of R with the highest expected value of user arrival time, as well as removing this element from R. The function Select(R) may be parameterized so that luminaires can only be selected after a certain delay has expired since the luminaires was last dimmed. The delay may depend e.g. on consumer research such as what delay is perceived suitable by consumers. Also other parameters may also be used.

Also a function Accept(R, Di) may be defined for determining whether the reserve has sufficient capacity to be able to accept the demand response request. Thus, according to an embodiment the controlling is only performed if the reserve has sufficient capacity. The function can be configured for example based on historical data, whether there is enough capacity to accept a certain demand response request and to keep a certain safety level at the same time, or not. The Accept(R, Di) may return for example "1" or "0", or "yes" or "no" answer to the system.

Advantageously luminaires participating in a demand response request Di are also brightened when the presence of users is detected in the coverage areas of said luminaires. The set of luminaires may be brightened at least partly, while other luminaire(s) from the reserve may be dimmed at least partly advantageously simultaneously to maintain the load shedding required by the demand response action and thereby avoid creating short term spikes to the electric power grid. According to an example even maximally dimmed luminaires may be powered partly—advantageously they are never turn completely off due to technical and inhabitant comfort reasons.

It is to be noted that "demand response" is used before as a general term referring usually to an "economic demand response" aiming at energy efficiency goals. However, correspondingly some embodiments of the invention may also include another operating mode, namely an "emergency demand response" as said demand response, in which case a rapid load shedding is advantageously performed in response to a signal directly from a TSO (transmission system operator). TSOs are typically willing to pay substantial sums to a customer such as a lighting network operator if they maintain the readiness to receive emergency demand response requests. The capacity for emergency demand response depends on factors such as the time of day (i.e. are the streetlights on) and the amount of traffic which limits the dimming potential. In case the economic demand response related dimming has been performed, the capacity for emergency demand response is correspondingly reduced. The emergency demand response can involve further dimming beyond the maximum dimming that is permitted in the economic demand response. This further dimming potential is determined according to the minimum traffic safety requirements that are considered acceptable at times when the grid is under stress, with a possibility for conditions such as brownout or blackout.

Depending on the type of contract with the TSO, several kinds of embodiments of the invention are possible regarding the integration of emergency demand response functionality, including the following exemplary embodiments:

1) The TSO is informed of the load shedding capacity that the lighting network operator has regardless of any economic demand response actions. In this case, it is necessary to assume that the full capacity for economic demand response may be in use, in which case the function Accept(R, Di) returns false even for a small economic demand response request Di. The capacity for emergency demand response is the capacity for additional dimming in this situation to the minimum level of lighting that is considered acceptable for traffic safety in times of grid stress.
2) Another embodiment is basically similar to the embodiment 1 above, the difference being that all luminaires are dimmed to a predefined minimum level regardless of the traffic situation. This embodiment may be used in conjunction with embodiment 1 in a case the TSO has separate signals for grid stress (which can be handled by embodiment 1) and imminent danger of a serious condition such as a brownout or blackout (which is handled by embodiment 2).
3) One further embodiment of the invention results in a higher capacity for emergency demand response. In embodiments 1 and 2, there is a worst case assumption of maximum economic demand response capacity being already in use. In this embodiment, there is no such assumption; instead, the capacity for emergency demand response is continuously calculated based on the total power reduction of economic demand response requests that are currently active. In other words, the dimming status of all luminaires is considered in real time, and the capacity for emergency demand response is determined based on this information. The TSO will be automatically kept up to date about the maximum level of emergency demand response capacity, so this embodiment of the invention is only possible with TSOs that accept this mode of operation.
4) One embodiment of the invention is basically similar to embodiment 1, but there is no economic demand response functionality, in which case there is higher capability for emergency demand response.
5) One embodiment of the invention is basically similar to embodiment 2, but there is no economic demand response functionality, in which case there is higher capability for emergency demand response.
6) One embodiment of the invention is that the load shedding for an emergency demand response request is performed relative to the power consumption of the lighting network when no lights are dimmed, rather than relative to the current power consumption. This is basically different from previous embodiments in which the economic demand response related dimming actions are considered to be away from emergency demand response capacity.

The present invention offers advantages over the known prior art, such as balancing effectively any consumption peaks in an electric power grid and avoiding the creation of short term spikes to the grid by controlling the usage or electric consumption of the lighting network. In addition, thanks to the invention, this can be done without sacrificing the safety of the users. Moreover disturbances to urban environments due to continuous switching on and off, or dimming and brightening of the lighting network, as well as any annoying flashing effect of the light sources in the network, can be avoided or at least minimized by the embodiment of the invention described in this document.

In addition the approach of the present invention is based on principles, where traffic safety is not degraded: each user may be detected individually and a level of lighting required by traffic safety regulations is provided to that user by real-time detection of the user and real time control of the luminaires to illuminate a sufficient length of in front of that user. In addition the smart street lighting system according to the invention is advantageously decoupled from the traffic monitoring system and is able to receive the traffic detection measurements over an Internet interface.

BRIEF DESCRIPTION OF THE DRAWINGS

Next the invention will be described in greater detail with reference to exemplary embodiments in accordance with the accompanying drawings, in which.

DETAILED DESCRIPTION

Figure 1:
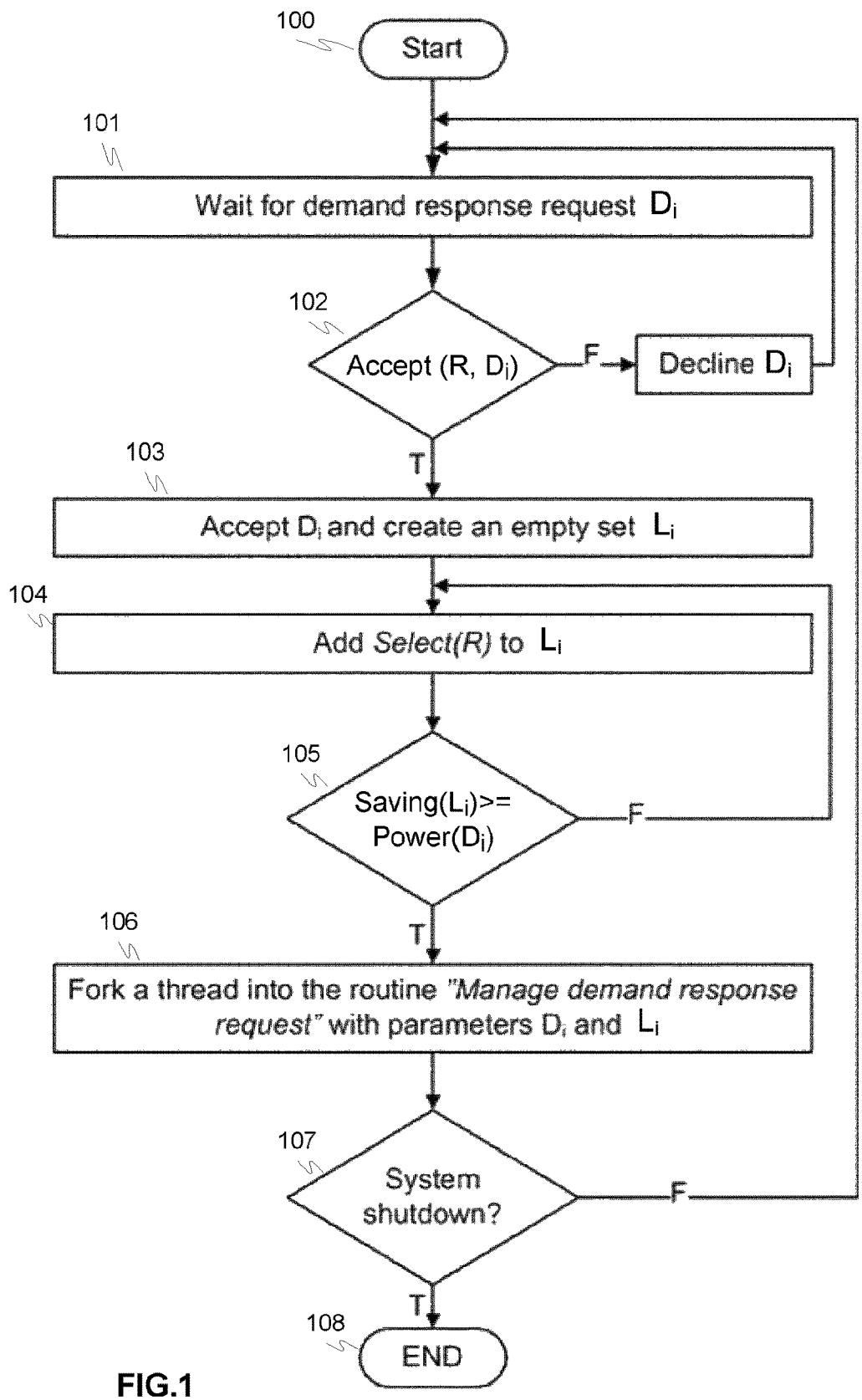
FIGS. 1-2 illustrate a principle of an exemplary method for controlling a lighting network based on traffic monitoring according to an advantageous embodiment of the invention.
Figure 2:
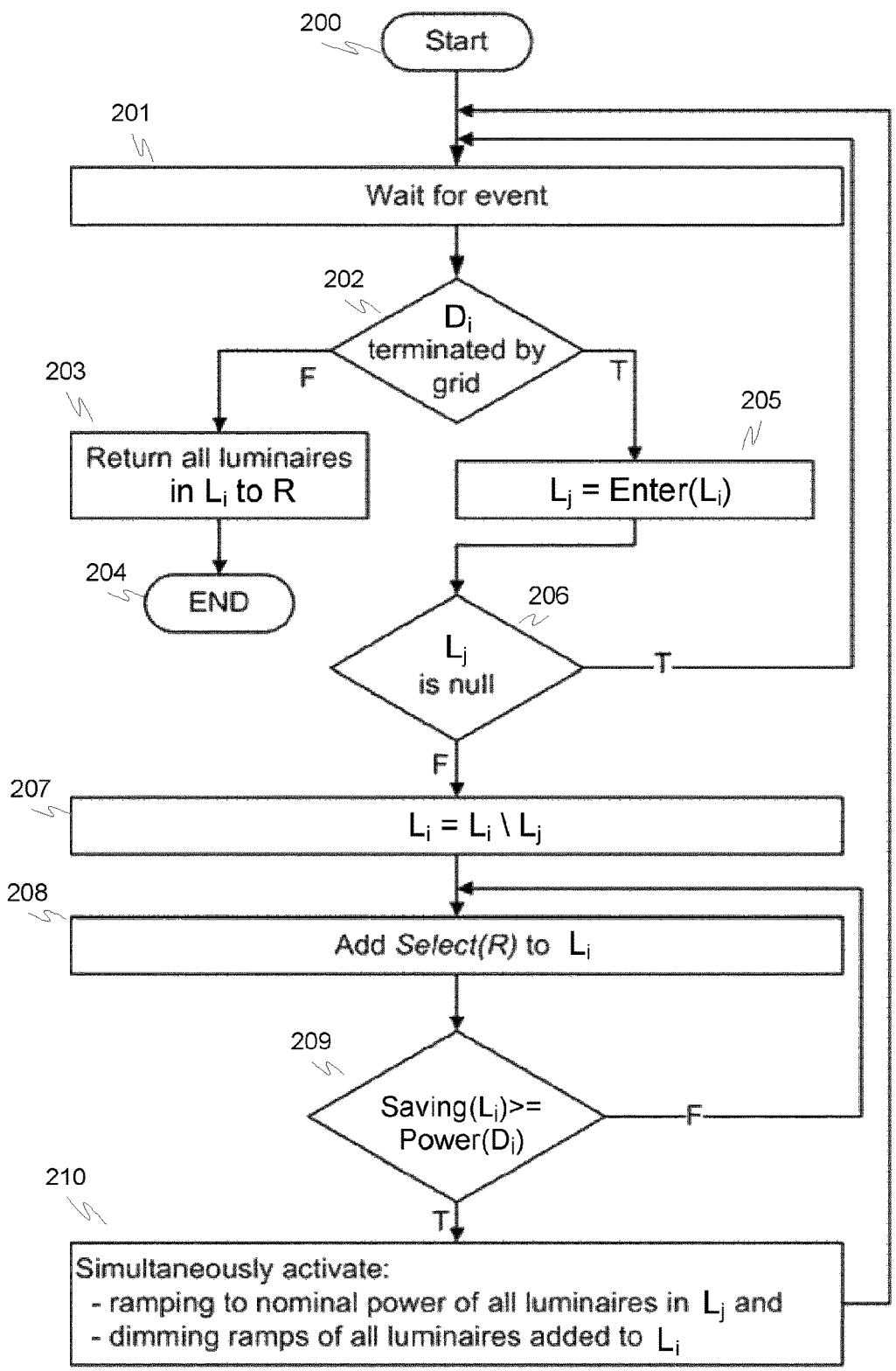

FIGS. 1-2 illustrate a principle of an exemplary method 100, 200 for controlling a lighting network based on traffic monitoring according to an advantageous embodiment of the invention, where in FIG. 1 a main routine 100 and in FIG. 2 manage demand response request routine are described in more details.

The method exploits the capability of individual LED luminaires to be adjusted frequently and rapidly without adverse impacts on the lifetime of the luminaire. In the method the presence of road users is detected and much more significant dimming is performed when there are no road users in the coverage range of the luminaire. There are several possibilities for performing the detection, including but not limited to: (1) traffic monitoring systems using sensors to detect road users, (2) position signals from vehicles or (3) smart phone applications. When the last road user exits the coverage range of the luminaire, no dimming action is necessarily performed, but the streetlight automation system moves that luminaire into a reserve (which may be maintained in a memory of the system exemplarily described in FIG. 3).

For each luminaire in the reserve, there is determined an expected value for the time of when the next road user will arrive in its coverage range. This expected value may be obtained in several ways, including but not limited to: (1) from historical statistical data for that time of day, week and year at that location, (2) by sophisticated prediction algorithms using real-time measurements from traffic monitoring systems or (3) based on knowledge of the road users planned route e.g. from navigators in vehicles.

The sequence $D=(D_1, \ldots, D_i)$ is defined as the sequence of demand response requests from the smart power grid. The function $Power(D_i)$ returns the load shedding requirement in [W] for the demand response request $D_i$. $L=(l_1, \ldots l_n)$ is defined as the set of luminaires that may be controlled. Each $l_i$ in L may either be a single luminaire or a group of luminaires that should be dimmed simultaneously; henceforth, the term "luminaire" is used instead of "luminaire or a group of luminaires". $L_i=(l_1, \ldots, l_n)$ is a set of luminaires to be dimmed in to achieve the load shedding request $D_i$; $L_i$ is a subset of L. The function $Saving(l_i)$ returns the load shedding in [W] when the luminaire $l_i$ is dimmed in a situation when there are no road users in its coverage range. $Saving(L_i)$ returns the load shedding of all luminaires in $L_i$; $|L_i|$ is used to denote the number of elements in $L_i$.

$$Saving(L_i) = \sum_{i=1}^{|L_i|} Saving(l_i)$$

The level of dimming depends on public acceptance, but according to researches, $Saving(l_i)$ could be 60% of the normal operating power of $l_i$ in urban environments; in less densely populated environments a higher percentage of 70-85% is considered acceptable. R is the set of luminaires in the reserve; R is a subset of L. The function Select(R) returns the element of R with the highest expected value of road user arrival time; the function also removes this element from R; the function may be parameterized so that luminaires can only be selected after a delay has expired since it was last dimmed. Finally, a function $Accept(R, D_i)$ determines whether the reserve has sufficient capacity to be able to accept the demand response request; the function can be configured based on historical data. The reason for not depleting the reserve below a certain threshold is to be able to handle situations in which a road user enters the coverage range of a luminaire in $L_i$. The main routine 100 is shown in FIG. 1.

In the method 100 the demand response request $D_i$ is waited in step 101, and in step 102 it is determined whether the demand response request can be accepted in view of the function $Accept(R, D_i)$. If the demand response request can't be accepted, the routine moves back to the waiting step 101. Otherwise the demand response request is accepted in step 103 and an empty set $L_i$ is created and Select(R) is added to the $L_i$ in step 104. The $Saving(L_i)$ is compared to $Power(D_i)$ in step 105 to find out whether the load shedding of the luminaires [$Saving(L_i)$] is greater than or equal to load shedding requirement [$Power(D_i)$] If this is the case, the routine continues to step 106 to manage demand response requests with parameters $D_i$ and $L_i$ as well as back to the step 101 for waiting demand response requests until the method is ended at step 107, 108. Otherwise [if $Saving(L_i)<Power(D_i)$] the routine continues the previous steps.

The main routine 100 forks a thread into the routine 200 "Manage demand response request" described in FIG. 2, where the routine waits events in step 201. This thread will continue until the demand response request is terminated (202, 203, 204) from the grid. If the routine is terminated, all luminaires in $L_i$ are returned to R in step 203 the routine is ended in step 204. Otherwise the function Enter(Li) returns $L_j$, which is the set of luminaires in $L_i$ with a road user in coverage range in step 205; $L_j$ is a subset of $L_i$ (207) The function Enter(Li) returns null in steps 206 if no road user has entered the coverage range of any luminaire, and the routine continues to step 201 for waiting events. In step 207, the luminaires in $L_j$ are removed from $L_i$ (the set of luminaires participating in the demand response action), so a sufficient number of additional luminaires need to be selected from the reserve R to compensate for the loss. This is accomplished in step 208: Select(R) is added to the $L_i$. The $Saving(L_i)$ is compared to $Power(D_i)$ in step 209 to find out whether the load shedding of the luminaires [$Saving(L_i)$] is greater than or equal to load shedding requirement [$Power(D_i)$]. If this is the case, the routine continues to step 210. Otherwise [if $Saving(L_i)<Power(D_i)$] the routine continues the previous steps. In step 210 the following actions may be performed: ramping to nominal power of all luminaires in $L_j$ and dimming ramps of all luminaires added to $L_i$.

The purpose of the routine is to handle the problem of a road user entering into the coverage range of a luminaire in $L_i$, in which case that luminaire needs to be ramped to full power, while other luminaire(s) from the reserve need to be dimmed to maintain the load shedding required by the demand response action. The ramping to full power and the dimming ramp(s) are activated advantageously simultaneously to avoid creating short term spikes to the grid.

Figure 3:
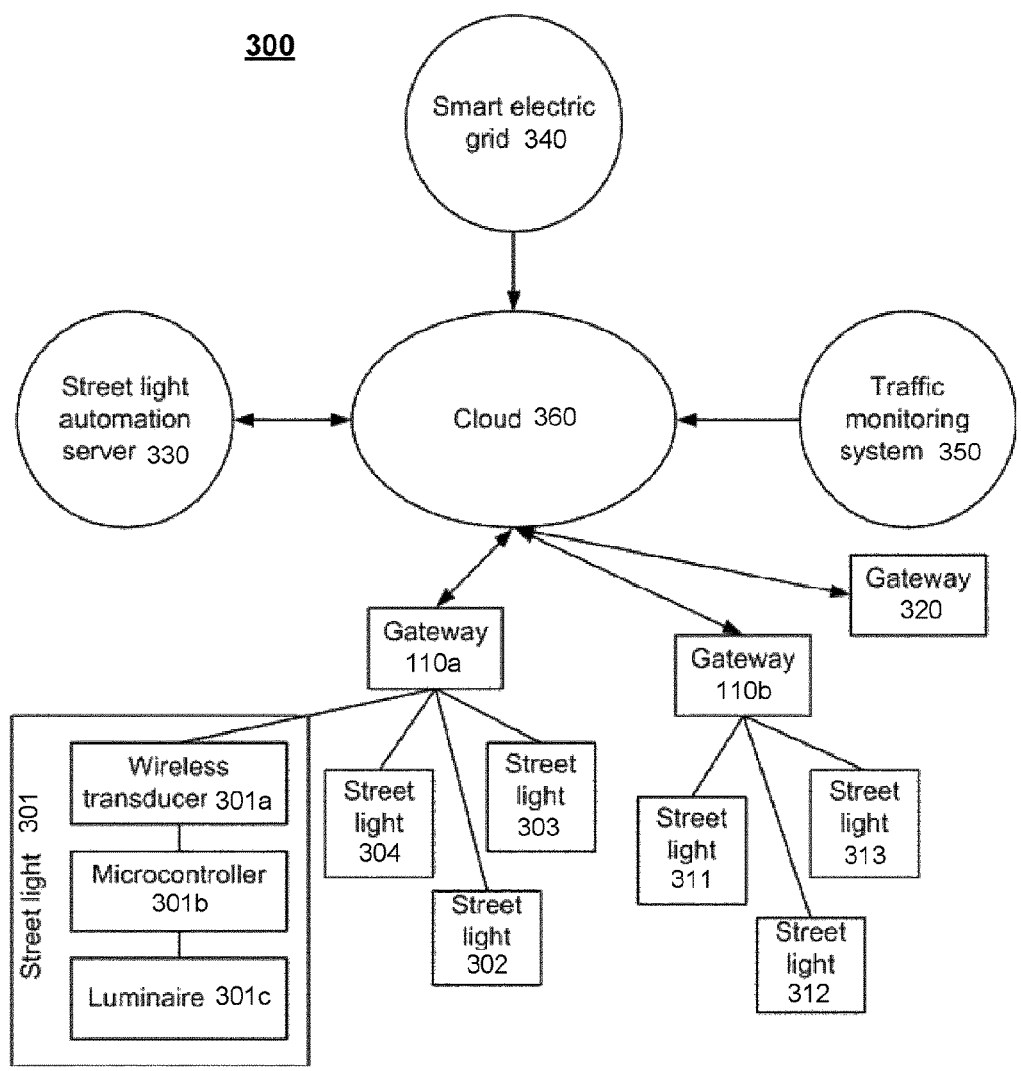
FIG. 3 illustrates an exemplary system for controlling a lighting network based on traffic monitoring according to an advantageous embodiment of the invention.

FIG. 3 illustrates an exemplary system 300 for controlling a lighting network based on traffic monitoring according to an advantageous embodiment of the invention.

The components that are installed on each street are explicitly illustrated for street light 301: the brightness of a luminaire 301c is adjusted by a control signal from a microcontroller 301b, which receives information and commands advantageously over the Internet by a wireless transducer 301a, which is used to communicate with a gateway 110a. The gateway has advantageously an Internet connection, and is able to address other systems via the cloud 360. Several street lights in the vicinity of a gateway may use the gateway for Internet access; for example, street lights 301, 302, 303 and 304 use gateway 110a and street lights 311, 312, and 313 use gateway 110b. Only a few gateways and streetlights are illustrated.

One of the reasons for using gateways instead of having an internet connection on each street light is to limit costs of electronics with internet connectivity and to limit the number of devices connected to the cloud and thus the costs charged by the cloud operator. However, an alternative solution would be to have an Internet connection on each street light. The street light automation server 330 receives traffic sensing information from a traffic monitoring system 350 and demand response requests from the smart electric grid 340 via the cloud 360. The street light automation server 330 runs the algorithms, which are specified in terms of luminaires. Each luminaire $l_i$ in the automation software has a mapping to one or more street light in the system architecture, henceforth referred to as street light i. This mapping includes the IP address of the relevant gateway as well as the address used by the gateway to communicate with the wireless transducer of street light i. The nature of this address depends on the protocol used; a possible and one example protocol is 6lowpan, in which case an IPv6 address is assigned to each street light, and its wireless transducer is an IPv6 device.

Based on this mapping, whenever the algorithm being run on server 330 issues a command to adjust the brightness of luminaire $l_i$, this command is transmitted via the relevant gateway to the microcontroller of street light i, which then adjusts the control signal for the luminaire. The algorithms specify commands for starting ramps to adjust the brightness of a luminaire. In one embodiment of the invention, the command to initiate the ramp for luminaire $l_i$ as well as the parameters of the ramp are transmitted from the street light automation server 330 to the microcontroller of street light l, which is then responsible for generating the control signal to the luminaire according to the ramp parameters.

Another exemplary embodiment of the invention uses the DALI (Digital Addressable Lighting Interface) standard for communications between the gateway and street lights. In this case, the wireless transducer 301a is replaced by a wired connection to the gateway, which acts as a DALI controller.

The potential of the invention is highest if the size of the reserve is low relative to the total number of luminaires in the system. This can be achieved if the traffic level in the area is stable. Thus the invention has the highest potential when applied to a broad area, preferable to the entire area covered by the distribution grid, which often is an entire city. The minimum size of the reserve can be estimated from statistical data for the area and for the time of day, week and year. Demand response requests from the grid will only be accepted if the minimum reserve can be maintained.

The main routine 100 above describes the behavior under economic demand response. In the case of emergency demand response, the following additional features apply or may apply (not shown in the Figures). By default the system is in economic demand response mode. If an emergency demand response request is received, the system goes into emergency demand response mode, in which it does not react to economic demand response request, nor does it brighten any luminaires participating in economic demand response requests if such requests are terminated. Rather, the termination events are stored and they are processed only when the system goes back into economic demand response mode, which will happen when no emergency demand response request is active.

In is to be noted that it is advantageously expected that in most embodiments, only one emergency demand response request may be active at a time. When the emergency demand response mode is entered, for each active economic demand response request Di, all luminaires Li participating in that request are dimmed further in order to shed load. This dimming is done to a predefined level that is considered to meet minimum requirements for traffic safety during grid emergencies. In case the traffic monitoring system is able to distinguish between user types, so that the economic demand response dimming levels are different for each type of user, the said predefined dimming levels for emergency demand response may also be different for different user types. For example, one possible implementation is that for pedestrians the light could be shut down completely, while for vehicles the dimming level is determined in such a way that the change is not so abrupt as to cause danger.

In the main routine 100, the Accept( ), Select( ), Power( ) and Saving( ) functions have advantageously different parameters in economic and emergency modes, to reflect a greater tolerance for dimming and frequent changes of lighting levels in emergency mode. In the routine 200 "Manage demand response request", the function Enter( ) may be parameterized differently in the emergency mode. The coverage areas may be smaller and certain user types such as pedestrians or bicycles may be ignored, in case the traffic monitoring system is able to distinguish between user types.

The invention has been explained above with reference to the aforementioned embodiments, and several advantages of the invention have been demonstrated. Especially it is to be noted that the invention can be applied both with outdoor and indoor solutions, such as for controlling street light systems on the outdoor roads, but also for controlling indoor lighting systems as well for example in offices, shopping centres, exhibition centres or the like.

It should be noted that the "demand response" refers to and comprises in this document both terms of "economic demand response" as well as "emergency demand response", if specifically not otherwise stated in the connection with a certain embodiment.

In addition it should be noted that some embodiments of the invention relate for controlling an outdoor lighting network with the capability to receive information about road users, such as vehicles, bicyclists and pedestrians, in the coverage areas of the luminaires, whereas some embodiments relate for controlling an indoor lighting network with the capability to receive information about users from an occupancy detection system. As a conclusion the method and system and computer program product according to the embodiments described in this document and covered by the scope of the claims can be used for controlling both the outdoor and outdoor lighting networks, correspondingly.

The invention claimed is:

1. A method for controlling a lighting network based on traffic monitoring, wherein the lighting network comprises set of luminaires, and each luminaire comprising at least one light source, wherein the method comprises steps of: determining plurality of coverage areas of the set of luminaires, receiving information related to a presence of users in said coverage areas, changing a status of at least certain luminaire to a reserve status when a last detected user exits the coverage area of said luminaire, providing for each coverage area of luminaire an expected value for the time of when a next user is expected to arrive in the coverage area of said luminaire, defining a set of at least one luminaire of said at least one luminaire with the reserve status based on said provided expected value, receiving information related to demand response request $(D_1, \ldots, D_n)$ of an electric power grid, and controlling at least dimness of the light source, the luminaire or the set of luminaires, and at least one of said defined set of luminaires in said reserve status in order to fulfil said demand response request at least partially when the reserve status has capacity over a predetermined level.

2. The method of claim 1, wherein the set of luminaires comprises at least one light source suitable to be controlled frequently and rapidly.

3. The method of claim 1, wherein a maximum level for dimming or the size of the coverage area of said defined set of luminaires in said reserve is determined beforehand.

4. The method of claim 3, wherein said maximum dimming level or the size of the coverage area depends on the time of day, week or year; or location of said coverage areas of the set of luminaires in reserve.

5. The method of claim 1, wherein said set of the luminaires in the reserve (R) is a subset of set of luminaires $(L=(l_1, \ldots l_n))$ in an entire system, whereupon a function Select(R) is defined for providing the element of said set of the luminaires in the reserve (R) with the highest expected value of user arrival time, such that removing this element from said set of the luminaires in the reserve (R).

6. The method of claim 5, wherein the function Select(R) is parameterized so that a luminaire is to be selected after a certain delay has expired since the luminaire was last dimmed.

7. The method of claim 1, wherein the method comprises defining a function Accept(R, Di) for determining whether the reserve has capacity over a predetermined level and thereby able to accept the demand response request, and where the controlling is performed when the reserve has capacity over said predetermined level.

8. The method of claim 1, wherein the method comprises brightening luminaires selected in the demand response request (Di) when the presence of users is detected in the coverage areas of said luminaires; said set of luminaires is brightened at least partly, while other luminaire from the reserve are dimmed at least partly simultaneously to maintain a load shedding required by the demand response action and to avoid creating short term spikes to the electric power grid.

9. The method of claim 1, wherein information of a presence of users in coverage areas indoor or outdoor comprises information of a type of said user, whereupon the maximum dimming level or the size of the coverage area is determined based on said type of the user.

10. The method of claim 1, wherein information of a presence of users in said coverage areas comprises: information from detecting sensors of traffic monitoring systems, information of position signals from vehicles or information of position signals from smart phone applications.

11. The method of claim 1, wherein providing said expected value for each luminaire comprises: obtaining said expected value from historical statistical data for that time of day, week and/or year at that location, obtaining said expected value by prediction algorithms using real-time measurements from traffic monitoring systems or obtaining said expected value based on knowledge of the users planned route, from navigators in vehicles.

12. The method of claim 1, wherein the method further comprises: defining a sequence $D=(D_1, \ldots, D_i)$ as the sequence of demand response request from the electric power grid, defining a function Power($D_i$) for providing a load shedding requirement in (W) for said demand response request (Di), defining a sequence $L=(l_1, \ldots l_n)$ as the set of luminaires that is controlled, where each (li in L) comprises a single luminaire or a group of luminaires that are to be dimmed simultaneously, and defining a function Saving(li) for providing the load shedding in (W) when the luminaire ($l_i$) is dimmed.

13. The method of claim 1, wherein the demand response request comprises an economic demand response aiming at energy efficiency goals or emergency demand response aiming rapid load shedding.

14. The method of claim 13, wherein for said emergency demand response at least portion or all luminaires are dimmed to at least predefined minimum level regardless of the traffic situation or beyond the maximum dimming that is permitted in the economic demand response.

15. The method of claim 13, wherein the emergency demand response is continuously calculated based on a total power reduction of the economic demand response request that are currently active and dimming status of all luminaires is considered in real time.

16. The method of claim 2, wherein the light source comprises a LED luminaire suitable to be controlled, comprising dimming.

17. A system for controlling a lighting network based on traffic monitoring, wherein the lighting network comprises set of luminaires, and each luminaire comprising at least one light source, wherein the system comprises: a device for determining plurality of coverage areas of the set of luminaires, a device for receiving information related to a presence of users in said coverage areas, a device for changing a status of at least certain luminaire to a reserve status, when a last detected user exits the coverage area of said luminaire, a device for providing for each coverage area or luminaire an expected value for the time of when a next user is expected to arrive in the coverage area of said luminaire, a device for defining a set of luminaires of said luminaires with the reserve status based on said provided expected value, a device for receiving information related to demand response request $(D_1, \ldots, D_n)$ of an electric power grid for indicating load shedding requirement, and a controller device for controlling, dimming of the light source, the luminaire or the set of luminaires, and at least one of said defined set of luminaires in said reserve status in order to fulfil said demand response request at least partially when the reserve status has capacity over a predetermined level.

18. The system of claim 17, wherein the set of luminaires comprises at least one light source suitable to be controlled, frequently and rapidly.

19. The system of claim 17, wherein said set of the luminaires in the reserve (R) is a subset of set of luminaires $(L=(l_1, \ldots l_n))$ in an entire system, whereupon a function Select(R) is defined for providing the element of said set of the luminaires in the reserve (R) with the highest expected value of user arrival time, such that removing this element from said set of the luminaires in the reserve (R).

20. The system of claim 19, wherein the system is configured to parameterize the function Select(R) so that luminaire is to be selected after a certain delay has expired since the luminaire was last dimmed.

21. The system of claim 17, wherein the system is configured to define a function Accept(R, Di) for determining whether the reserve has capacity over a predetermined level and thereby able to accept the demand response request, and where the controlling is performed when the reserve has capacity over said predetermined level.

22. The system of claim 17, wherein the system comprises a device for brightening luminaires selected in the demand response request (Di) when the presence of users is detected in the coverage areas of said luminaires indoor or outdoor; said set of luminaires is brightened at least partly, while other luminaire(s) from the reserve are dimmed at least partly simultaneously to maintain a load shedding required by the demand response action and to avoid creating short term spikes to the electric power grid.

23. The system of claim 17, wherein the system is further configured to: define a sequence $D=(D_1, \ldots, D_i)$ as the sequence of demand response request from the electric power grid, define a function Power($D_i$) for providing a load shedding requirement in (W) for said demand response request ($D_i$), define a sequence $L=(l_1, \ldots l_n)$ as the set of luminaires that is to be controlled, where each ($l_i$ in L) comprises a single luminaire or a group of luminaires that are to be dimmed simultaneously, and define a function Saving(li) for providing the load shedding in (W) when the luminaire ($l_i$) is dimmed.

24. The system of claim 17, wherein the light source comprises a LED luminaire suitable to be controlled, comprising dimming.

* * * * *